United States Patent [19]

Kobayashi et al.

[11] Patent Number: 5,360,652
[45] Date of Patent: Nov. 1, 1994

[54] OPTICAL RECORDING DISC

[75] Inventors: Takahiro Kobayashi; Seiro Fujii; Satoshi Jinno, all of Tsurugashima, Japan

[73] Assignee: Pioneer Electronic Corporation, Tokyo, Japan

[21] Appl. No.: 961,359

[22] Filed: Oct. 15, 1992

[30] Foreign Application Priority Data

Nov. 18, 1991 [JP] Japan .................. 3-301775

[51] Int. Cl.$^5$ ............................................. B32B 3/00
[52] U.S. Cl. ............................................. 428/64; 428/65; 428/913; 430/270; 430/945; 346/76 L; 346/135.1
[58] Field of Search ............................ 428/64, 65, 913; 430/270, 945; 346/76 L, 135.1

[56] References Cited

U.S. PATENT DOCUMENTS

| | | | |
|---|---|---|---|
| 4,716,063 | 12/1987 | Uehara et al. | 428/65 |
| 4,729,938 | 3/1988 | Tajima et al. | 430/272 |
| 4,821,050 | 4/1989 | Yabe et al. | 346/137 |
| 4,954,379 | 9/1990 | Nishida et al. | 428/64 |
| 5,227,213 | 7/1993 | Komori et al. | 428/64 |

OTHER PUBLICATIONS

Mool C. Gupta, "Laser Recording on an Overcoated Organic Dye–Binder Medium", Applied Optics, vol. 23, No. 22, 1984, pp. 3950–3953.

Primary Examiner—Patrick J. Ryan
Assistant Examiner—Elizabeth Evans
Attorney, Agent, or Firm—Sughrue, Mion, Zinn, Macpeak & Seas

[57] ABSTRACT

The present invention relates to an optical recording disc comprising two disc bases each having a recording layer formed on one surface side of a substrate bonded to each other by the medium of an adhesive layer with both recording layers facing each other. The adhesive layer, containing an adhesive and a reaction initiator, is hardened through polymerization reaction by the reaction initiator and photopolymerization reaction by ultraviolet-ray irradiation. For this reason, the adhesive layers of both disc bases can be bonded together entirely and uniformly and besides, the adhesive layer can rapidly get hardened, which is advantageous for enhancing productivity of a double-face type optical recording disc.

9 Claims, 1 Drawing Sheet

OPTICAL RECORDING DISC

BACKGROUND OF THE INVENTION

The present invention relates to an optical recording disc used for optically recording and reproducing information.

There is known a so-called double-face optical recording disc comprising two disc bases having recording layers on the surfaces thereof, respectively, bonded to each other oppositely by the medium of an adhesive layer. This double-face optical recording disc has an advantage for a large recording capacity.

Conventionally, this double-face optical recording disc is prepared by coating its respective disc base surfaces to be bonded to each other, using a roller coating method, with a pure solid hot melt adhesive such as an adhesive mainly containing EVA resin excluding any liquid or solvent. Also a reactive adhesive such as epoxy resin type adhesive is used therefor in some cases.

This conventional type double-face disc has, however, some manufactural problems. One problem is that, when the disc bases thereof are made of glass and coated with the hot melt adhesive, using the roller coating method as described above, the surfaces of the glass bases cannot be entirely and sufficiently coated with the hot melt adhesive, that is, the surfaces to be bonded to each other cannot be uniformly bonded together.

Another problem is that, when a reactive adhesive such as one mainly containing epoxy resin is used for bonding two disk bases, it takes a long period of time for the adhesive layer to be completely hardened, which results in low productivity thereof.

It is conceivable that a so-called 2P-adhesive (photo-polymerization adhesive) having ultraviolet-ray hardenability is used for bonding two disc bases together. However, there lies also a problem that, since a so-called double-face optical disc comprises two disc bases, both of which are provided with a recording layer, respectively, not permitting light to penetrate therethrough, the adhesive between such recording layers cannot be irradiated by ultraviolet rays, with the result that the adhesive cannot be hardened all over the inner surfaces of the disc bases.

SUMMARY OF THE INVENTION

An object of the present invention is to provide a double-face optical recording disc wherein both adhesive layer surfaces of the two disc bases are entirely bonded to each other and productivity of which can be enhanced.

To achieve this object, a double-face optical recording disc of the invention wherein two disc bases each provided with a recording layer on a surface of a substrate (hereinafter referred to as simply "disc base") are bonded to each other with the respective recording layers facing each other is characterized in that a reactive initiator is added in the adhesive layer between the recording layers and the adhesive layer is hardened through polymerization reaction by the reaction initiator described above and photo-polymerization reaction by ultraviolet-ray irradiation.

The optical recording disc of this invention is provided with an adhesive layer for bonding respective recording layers of two disc bases opposite to each other and the adhesive layer is made of a resin having hardenability through polymerization reaction by a reaction initiator and photo-polymerization reaction by ultraviolet-ray irradiation. More specifically, when the ultraviolet-ray irradiation is applied to this adhesive layer, the irradiated part thereof will be quickly hardened. On the other hand, since the recording layer does not permit ultraviolet rays to penetrate therethrough, the adhesive layer between the recording layers opposite to each other is not irradiated by ultraviolet rays, with the result that the non-irradiated part of adhesive layer will not be hardened. Instead, the adhesive layer contains the reaction initiator to activate polymerization reaction in the latter part of adhesive layer not yet hardened, only after the former part of adhesive layer initiates hardening. For this reason, while a part of adhesive layer other than the adhesive layer on the recording layer initiates hardening by ultraviolet rays which are permeable through the substrates to irradiate the above part, the rest non-irradiated part of adhesive layer which is blocked off by two recording layers will sequentially initiate hardening by the reaction initiator and get completely hardened in a very short period of time. The optical recording disc of this invention has thus two disc bases bonded to each other entirely and uniformly and besides attains higher productivity.

DESCRIPTION OF THE PREFERRED EMBODIMENT

An embodiment of this invention will now be explained in reference to the drawings.

Figure 1:
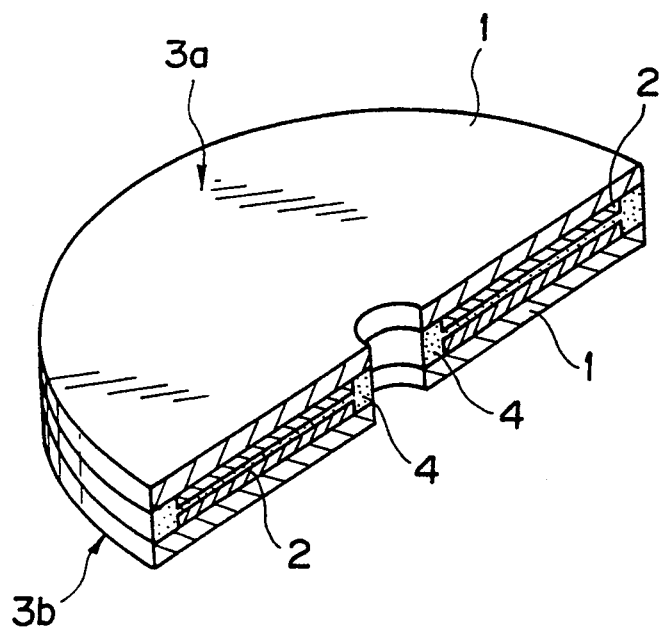
FIG. 1 is a perspective section showing an optical recording disc according to the present invention.
Figure 2:
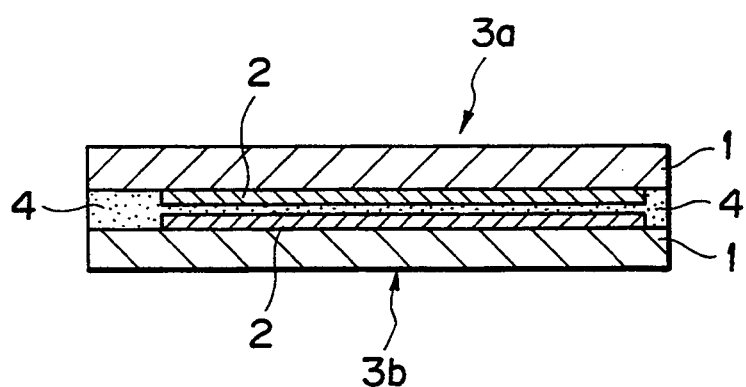
FIG. 2 in a schematic section view showing an adhesive layer of the optical recording disc of this invention.

As shown in FIG. 1, an optical recording disc comprises two disc bases 3a, 3b each provided with a recording layer 2 on one surface side of a light-permeable substrate 1, the respective recording layer 2 being opposed and bonded to each other by the medium of an adhesive layer 4.

A material for the substrate may be anything light-permeable, for instance, optical glass or acrylate resin. Glass is most preferable among them.

The recording layer 2 formed on one surface side of the substrate 1 is prepared from materials suitable for optically recording, for instance, a photomagnetic recording material such as TbFe, GdCo, GdTbFe or MnCuBi, or an optical recording material such as Te-type suitable for pit formation, or an optical recording material such as As—Te—Ge type or Sn—Te—Se type taking advantage of the phase change thereof.

The recording layer 2 may be formed directly on the substrate 1 or may be formed on a proper medium having light-permeability, for instance, a transfer layer having grooves made of an ultraviolet-ray hardenable resin.

The recording layer 2 is formed on one surface side of the substrate 1 to constitute each disc base 3a, 3b, all the identical surface side of which is provided with the adhesive layer 4.

This adhesive layer 4 is formed of a so-called two liquid type 2P adhesive prepared from an ultraviolet-ray-hardenable 2P (photopolymerization) adhesive and a reaction initiator added thereto; the ultraviolet-ray-hardenable 2P adhesive contains mainly a photodecomposition type photosensitive resin of aromatic deazonium salt type using deazoresin condensed from aromatic deazonium salt by formaldehyde, or using a combination of this deazoresin and poval (polyvinylalcohol) or phenolic resin, photodimerization type photosensitive resin, for instance, obtained by introducing cinnamic acid group to side chains of linear polymer such as poval or acrylate resin, or photopolymerization type photosensitive resin including prepolymer such as unsaturated polyester, epoxyacrylate or urethaneacrylate, or photo-radical polymerization resin product obtained by mixing poval, polyamide or polymethacrylate as binder polymer with various sorts of acrylate, methacrylate monomer and a photopolymerization initiator.

The reaction initiator mentioned above has the property of initiating polymerization reaction only after the above 2P adhesive initiates partly hardening, namely, while the 2P adhesive irradiated by ultraviolet rays initiates hardening, the non-irradiated 2P adhesive between the respective recording layers 2 of two disc bases 3a, 3b will be hardened through polymerization reaction by this reaction initiator.

The reaction initiator having the property mentioned above may be, for instance, p-isopropyl-α-hydroxy-isobutylphenone, α-hydroxy-isobutylphenone, benzoin.isobutylether, benzoin.iso-propylether, p-tert-butyl trichloroacetophenone, p-tert-butyldichloroacetophenone, n-butyl.isobutylbenzoinether mixture, 2,2-dimetoxy-2-phenylacetophenone, α,α-dichloro-4-phenoxyacetophenone, 1-phenyl-1,2-propanedion-2-(o-ethoxycarbonyl)oxime, 2-chlorothioxanthone, 2-methylthioxanthone, dibenzocycloheptanone, benzyl, benzoin.alkylether, N,N-tetraethyl-4,4-diaminobenzophenone, benzoin, methyl.ortho.benzoilbenzoate.

The additive ratio of the reaction initiator with regard to the above 2p adhesive is usually 0.5-80 weight %.

This two liquid type 2P adhesive, to which such a reaction initiator is added, has not only an ultraviolet-ray hardenability but also a reaction hardenability appearing when the adhesive initiates hardening by ultraviolet-ray irradiation.

This two liquid type 2P adhesive is applied on at least either one of the surfaces of disc bases 3a, 3b each provided with the recording layer (one surface side of the substrate 1 on which the recording layer 2 is formed and the surface of the recording layer 2) usually employing a spin-coating method most suitable for this application.

The two disc bases 3a, 3b, at least either of which has the recording layer thus coated with the adhesive, are bonded to each other by the medium of the adhesive layer 4 with the respective recording layer facing each other.

This adhesive layer 4 is irradiated with ultraviolet rays from at least either one side of the outer surfaces of the two substrates 1 (the surface side on which the recording layer is not formed), one substrate 1 forming the disk base 3a and the other substrate 1 forming the disc base 3b.

When ultraviolet-rays irradiation is thus applied to the disc, adhesive partly applied on the substrate on which the recording layer is not formed initiates hardening rapidly due to its ultraviolet-ray hardenability, while adhesive applied between two recording layers 2 is not subjected to the ultraviolet-ray irradiation because of the recording layer having no light-permeability. Instead, the latter non-irradiated adhesive can be quickly hardened because the reaction initiator activate hardening. Resultantly, the adhesive layer 4 get hardened uniformly every inch in a short period of time so that both the disc bases 3a, 3b can be bonded together entirely and uniformly to form a double-face optical recording disc.

What is claimed is:

1. An optical recording disc comprising two disc bases each having a recording layer formed on one surface side of a substrate bonded to each other by the medium of an adhesive layer with the respective recording layers facing each other, wherein said adhesive layer contains an adhesive and a reaction initiator, and said adhesive layer is hardened through polymerization reaction by said reaction initiator and photopolymerization reaction by ultraviolet-ray irradiation, wherein said adhesive layer is formed of a two-liquid type adhesive prepared from an ultraviolet-ray hardenable adhesive containing photodecomposition type photosensitive resin and a reaction initiator added thereto.

2. The optical recording disc according to claim 1, wherein said reaction initiator is a thioxanthone derivative.

3. An optical recording disc comprising two disc bases each having a recording layer formed on one surface side of a substrate bonded to each other by the medium of an adhesive layer with the respective recording layers facing each other, wherein said adhesive layer contains an adhesive and a reaction initiator, and said adhesive layer is hardened through polymerization reaction by said reaction initiator and photopolymerization reaction by ultraviolet-ray irradiation, wherein said adhesive layer is formed of a two-liquid type adhesive prepared from an ultra-violet-ray hardenable adhesive containing a photodimerization type photosensitive resin and a reaction initiator added thereto.

4. An optical recording disc comprising two disc bases each having a recording layer formed on one surface side of a substrate bonded to each other by the medium of an adhesive layer with the respective recording layers facing each other, wherein said adhesive layer contains an adhesive and a reaction initiator, and said adhesive layer is hardened through polymerization reaction by said reaction initiator and photopolymerization reaction by ultraviolet-ray irradiation, wherein said adhesive layer is formed of a two-liquid type adhesive prepared from an ultraviolet-ray hardenable adhesive containing a photopolymerization type photosensitive resin and a reaction initiator added thereto.

5. An optical recording disc comprising two disc bases each having a recording layer formed on one surface side of a substrate bonded to each other by the medium of an adhesive layer with the respective recording layers facing each other, wherein said adhesive layer contains an adhesive and a reaction initiator, and said adhesive layer is hardened through polymerization reaction by said reaction initiator and photopolymerization reaction by ultraviolet-ray irradiation, wherein said reaction initiator is a non-cyclic monoacyl benzene derivative.

6. An optical recording disc comprising two disc bases each having a recording layer formed on one surface side of a substrate bonded to each other by the medium of an adhesive layer with the respective recording layers facing each other, wherein said adhesive layer contains an adhesive and a reaction initiator, and said adhesive layer is hardened through polymerization reaction by said reaction initiator and photopolymerization reaction by ultraviolet-ray irradiation, wherein said reaction initiator is benzil or a benzil derivative.

7. The optical recording disc according to claim 3, wherein said reaction initiator is benzoin or a benzoin derivative.

8. The optical recording disc according to claim 4, wherein the additive ratio of said reaction initiator with regard to said adhesive ranges from 0.5 to 80 weight %.

9. An optical recording disc comprising two disc bases each having a recording layer formed on one surface side of a substrate bonded to each other by the medium of an adhesive layer with the respective recording layers facing each other, wherein said adhesive layer contains an adhesive and a reaction initiator, and said adhesive layer is hardened through polymerization reaction by said reaction initiator and photopolymerization reaction by ultraviolet-ray irradiation, wherein said reaction initiator initiates polymerization reaction only after said adhesive layer is partially hardened through said polymerization reaction by ultra-violet-ray irradiation.

* * * * *